United States Patent [19]

Gardner

[11] 4,145,492

[45] Mar. 20, 1979

[54] CATALYTIC DEHYDROHALOGENATION PROCESS FOR ALLYLICALLY HALOGENATED UNSATURATED HYDROCARBON POLYMERS

[75] Inventor: Irwin J. Gardner, Fanwood, N.J.

[73] Assignee: Exxon Research & Engineering Co., Florham Park, N.J.

[21] Appl. No.: 775,389

[22] Filed: Mar. 7, 1977

[51] Int. Cl.$^2$ ............................................... C08F 8/26
[52] U.S. Cl. ..................................... 526/47.3; 526/20; 526/31; 526/47; 526/48.2; 526/48.3
[58] Field of Search ..................... 526/42.3, 48.2, 48.3

[56] References Cited

U.S. PATENT DOCUMENTS

| | | | |
|---|---|---|---|
| 3,775,387 | 11/1972 | Baldwin | 526/48 |
| 3,816,371 | 6/1974 | Baldwin et al. | 526/48 |
| 3,852,253 | 12/1974 | Malatesta | 526/48 |
| 3,919,131 | 11/1975 | Malatesta et al. | 526/48 |

Primary Examiner—William F. Hamrock
Attorney, Agent, or Firm—John J. Mahon; Harvey L. Cohen

[57] ABSTRACT

A heterogeneous catalytic process for dehydrohalogenating allylically halogenated olefinic hydrocarbon polymers to produce conjugated diene unsaturated polymeric products is disclosed comprising employing certain metal containing catalyst compositions, especially activated alumina supported copper containing catalysts. The process is especially suitable for the preparation of conjugated diene butyl elastomers from halogenated butyl rubber and produces products having relatively high reactivity levels in terms of active diene content.

20 Claims, No Drawings

CATALYTIC DEHYDROHALOGENATION PROCESS FOR ALLYLICALLY HALOGENATED UNSATURATED HYDROCARBON POLYMERS

This invention relates to the preparation of polymeric hydrocarbons having conjugated diene functionality and more particularly to a novel process for the dehydrohalogenation of allylically halogenated olefinically unsaturated hydrocarbon polymers, the halogen being chlorine or bromine.

The present invention, while developed with particular reference to the production of improved conjugated diene butyl elastomers, is applicable in its broadest sense as a means of effectively dehydrohalogenating in a heterogeneous catalytic liquid phase process any hydrocarbon composed of carbon and hydrogen and having allylic halogen, the halogen being chlorine or bromine substituted olefin functionality. Such polymers can be prepared by several methods including direct halogenation or inclusion of a suitable allylically halogenated monomer in the polymerizable compound. Generally the reaction proceeds by dehydrohalogenation as represented below

to provide sites of conjugated diene unsaturation.

The process of the present invention is carried out at moderate temperatures of about 50° to 250° C. and in the liquid phase, the polymer being used neat or in solution or slurry. So far as applicant is aware, the prior art does not disclose the use of the catalysts defined herein in liquid phase dehydrohalogenation of allylically halogenated hydrocarbon polymers to provide conjugated diene derivatives thereof.

A wide variety of unsaturated hydrocarbon polymers may be halogenated to produce an allylically halogenated polymer suitable for use in the present invention. The halogen is preferably chlorine or bromine with chlorine particularly preferred. These polymers include homopolymers and copolymers of one or more $C_4$-$C_{10}$ conjugated diolefins such as 1,4-polybutadiene, 1,4-polyisoprene, 1,2-polybutadiene; copolymers having a major proportion of one or more $C_4$-$C_8$ monoolefins of the structure $R-C(R_1)=CH_2$ where R and $R_1$ may be alkyl, aryl, alkylaryl and cycloalkyl and a minor proportion of one or more $C_4$-$C_{10}$ conjugated diolefins; block copolymers of a major proportion of one or more $C_4$-$C_{10}$ conjugated diolefins and a minor proportion of one or more $C_8$-$C_{14}$ vinyl aromatic hydrocarbons such as a butadiene-styrene copolymer; copolymers of one or more $C_2$-$C_{18}$ monoolefins of the general formula $R_2CH=CH_2$ where $R_2$ can be alkyl, aryl, alkylaryl or cycloalkyl with a minor proportion of one or more $C_6$ to $C_{12}$ non-conjugated diolefins such as terpolymers of ethylene, propylene and 1,4-hexadiene, dicyclopentadiene or 5-ethylidene-2-norbornene.

Numerous methods are known for producing allylically halogenated unsaturated hydrocarbon polymers such as by using molecular chlorine, sulfuryl chloride, trichloromethanesulfonyl chloride and tert-butyl hypochlorite. Particular reagents for the introduction of an allylic bromine are molecular bromine, N-bromosuccinimide and 1,3-dibromo-5,5-dimethyl hydantoin.

Conjugated diene butyl elastomers are known and are described in U.S. Pat. No. 3,775,387 issued to a Baldwin Nov. 27, 1973; No. 3,816,371 issued to Baldwin and Malatesta June 11, 1974; No. 3,852,253 issued to Malatesta Dec. 3, 1974; and in U.S. Ser. No. 465,479, filed Apr. 30, 1974.

Generally, these elastomers are copolymers consisting of from 85 to 99.5% by weight of a $C_4$-$C_7$ isoolefin combined with 15 to 0.5% by weight of a conjugated $C_4$-$C_{14}$ diolefin, the copolymer containing randomly distributed sites of conjugated diene unsaturation and small proportions of copolymer units with residual halogen present. The preferred method for preparing these elastomers is by dehydrohalogenation of the corresponding halogenated, that is, chlorinated or brominated, butyl rubber.

The expression "butyl rubber" is used in the rubber industry to describe copolymers made from a polymerization reaction mixture having therein from 70 to 99.5% by weight of an isoolefin which has about 4 to 7 carbon atoms, e.g. isobutylene, and about 30 to 0.5% by weight of a conjugated multiolefin having from about 4 to 14 carbon atoms, e.g. isoprene. The resulting copolymers contain 85 to 99.5% by weight of combined isoolefin and about 0.5 to 15% of combined multiolefin. The preparation of butyl rubber is described in U.S. Pat. No. 2,356,128, which is incorporated herein by reference. Butyl rubber generally has a number average molecular weight of about 5,000 to about 500,00, preferably 80,000 to about 250,000 and a Wijs Iodine No. of about 0.5 to 50, preferably 1 to 15. Low molecular weight butyl rubber is generally defined as having a $\overline{M}v$ of 5,000 to 30,000 and 2-10 mole % unsaturation.

The polymer backbone of commercial butyl rubber is made up primarily of isobutylene units, with just a few percent of isoprene units. The isoprene units contribute the small amount of unsaturation present in butyl rubber. The basic preparative equations are represented by:

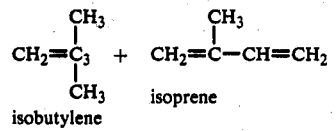

which combine to form its main structure:

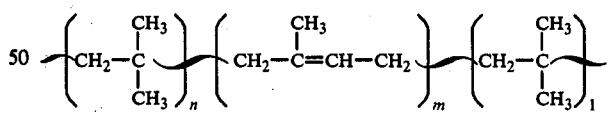

where n + 1 represent the number of isoolefin units incorporated in the butyl rubber, while m represents the number of diolefin units present, substantially as isolated units. The conjugated olefin loses its diene unsaturation upon its incorporation into the polymer backbone.

Thus, butyl rubber, as presently produced, contains only a small percentage of unsaturation, in the form of the single double bond associated with the isoprene residue which is incorporated more or less randomly throughout the polymer chain.

Halogenated butyl rubber has been developed in recent years and has contributed significantly to the elastomer business. A method of preparing halogenated butyl rubber is described in U.S. Pat. No. 3,099,644, which is incorporated herein by reference. Both chlorinated and brominated butyl rubber are known in the art. The formula for halogenated butyl rubber, X representing the halogen, is schematically typified by:

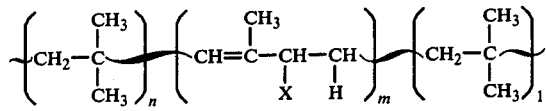

where n, 1 and m have the same values as for butyl rubber, described above, though this structure is but one of several which can be formed, depending on the conditions of halogenation, the halogenating agent used, etc.

U.S. Pat. No. 3,775,387 teaches a semihomogeneous process for preparing conjugated diene butyl elastomers comprising contacting a solution of halogenated butyl rubber with a soluble metal carboxylate, a soluble carboxylic acid and a metal oxide or hydroxide. The complexity of this system requires the efficient removal of the major portion of these materials and precise control of reactant concentrations is required during the process itself.

US. Pat. No. 3,852,253 teaches a heterogeneous process for conjugated diene butyl elastomers wherein a solution of halogenated butyl rubber is contacted with a strong mineral acid salt of a Group IIA or IIB metal, e.g. calcium or zinc, at a temperature of from 100° to 220° C. This process is capable of reducing the residual halogen content to very low levels.

The present invention in its preferred embodiments provides an alternate, relatively simple, but hightly effective process for producing these conjugated diene butyl (CDB) elastomers and is based on the discovery that certain metal containing catalysts can be used in carrying out the dehydrohalogenation of halogenated butyl rubber in the liquid phase and preferably in solution to provide improved CDB elastomers having a relatively high content of Diels-Alder active diene isomers.

The specific catalysts found useful in the present invention are as follows: cupric oxide (CuO), cuprous oxide ($Cu_2O$), cupric chloride ($CuCl_2$), cupric sulfate ($CuSO_4$), tantalum oxide ($Ta_2O_5$) and niobium oxide ($Nb_2O_5$). With the exception of $CuSO_4$, when allylically chlorinated polymers such as chlorinated butyl rubber are used as the polymer being dehydrochlorinated, these catalysts are to be used with activated alumina as a support, the catalyst composition comprising about 0.5% to 50% by weight of catalyst and about 95.5% to 50% by weight of activated alumina as the support medium. Preferably the catalyst-support composition will contain 5 to 15% by weight such as about 10% by weight of catalyst.

It has been found, however, that when the polymer being treated is an allylically brominated hydrocarbon, such as brominated butyl rubber, that $CuSO_4$, $Ta_2O_5$ and $Nb_2O_5$ are also effective when used without the alumina support. Otherwise, an activated alumina supported catalyst is generally required for effective dehydrobromination.

The catalysts enumerated above have been found to be effective while other metal catalysts, such as zinc oxide on alumina support, do not produce desirable results The use of activated alumina as a support is also considered critical since the copper catalysts named above were not as effective when a silicate support was used, the products exhibiting substantial inactive diene content and undesirable molecular weight loss. The particular effectiveness of copper catalysts in the present invention is considered unusual since these catalysts are generally categorized as olefin halogenation catalysts. Moreever, the effectiveness of $CuCl_2$ in connection with conjugated diene butyl is somewhat surprising since Malatesta in said U.S. Pat. No. 3,853,253 states that Friedel-Crafts catalysts are unsuitable in dehydrohalogenation processes. $CuCl_2$ is generally regarded as a Friedel-Crafts catalyst although a less active one than $AlCl_3$.

The preferred catalysts in the present invention are the copper oxides. While both CuO and $Cu_2O$ are equally effective, CuO is particularly preferred since it is readily available and, therefore, economically attractive.

The catalyst concentration used in the present invention is based on the ratio of halogen in the allylically halogenated polymer feedstock to metal in the metal-containing catalyst This halogen to metal molar ratio, such as a Cl to Cu molar ratio, may vary from 5000:1 to 1:10 preferably in the range of about 2500:1 to 1:1.

The process of the invention is a liquid phase dehydrohalogenation and may be carried out in bulk in the absence of solvent or in solution or slurry. In bulk, for example, the polymer could be pumped through a packed bed catalyst system. For higher molecular weight materials the process could be carried out in an extruder to provide a liquid phase in the absence of a solvent.

The process is carried out in solution by first dissolving the halogenated polymer, such as halogenated butyl rubber, in a suitable organic solvent such as a $C_5$–$C_8$ substantially inert hydrocarbon, e.g. pentane, hexane, heptane, isoparaffinic solvents, mineral spirits, cyclohexane, toluene, benzene, xylene and mixtures thereof. Suitable concentrations are in the range of about 5–75 wt. % depending on the molecular weight of the polymer such as 5–20% for higher molecular weight materials. The powdered catalyst is added to a stirred solution and the reaction mixture is stirred and heated at a temperature of about 50° to 250° C. with typical reaction times being about 1 minute to 3 hours, preferably 45 minutes to 2 hours. Preferably the reaction temperature will be about 100° to 180° C. Pressure may be used as required to keep the solvents, when used below their boiling point. A method for HCl removal such as a nitrogen or inert gas sweep may be used to minimize diene isomerization or molecular weight degradation.

The CDB elastomers produced in accordance with the present invention will have a residual halogen content of about 0.05 to 0.9% by weight, a mole percent conjugated diene unsaturation in the range of about 0.4 to about 10 mol % and a number average molecular weight of about 8,000 to about 500,000. For lower molecular weight copolymers, that is less than 100,000, the mol % diene content is 0.4 to 10 while for polymer is excess of $\overline{M}v = 100,000$ the range is 0.4 to about 4% diene content.

Structurally, the conjugated diene butyl elastomers produced in accordance with the present invention have been found to possess a distinct halogenated structure with respect to the residual halogen remaining after the reaction. The residual halogen in the products of the present invention has been found to be present as a primary allylic halogen, that is, the halogen is attached to a primary carbon atom. This structure is depicted below for a unit of the preferred conjugated diene butyl copolymers of the present invention derived from dehydrohalogenation of halogenated isobutyleneisoprene butyl rubber:

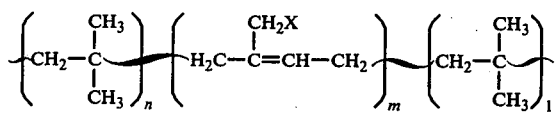

where X represents a halogen and n + m represent the number of isoolefin units incorporated into the butyl rubber polymer backbone. This structure is contrasted with the halogen location in the halogenated butyl rubber prior to dehydrohalogenation which is depicted in the series of structures below, in which the halogen is always bonded to a secondary or tertiary carbon atom:

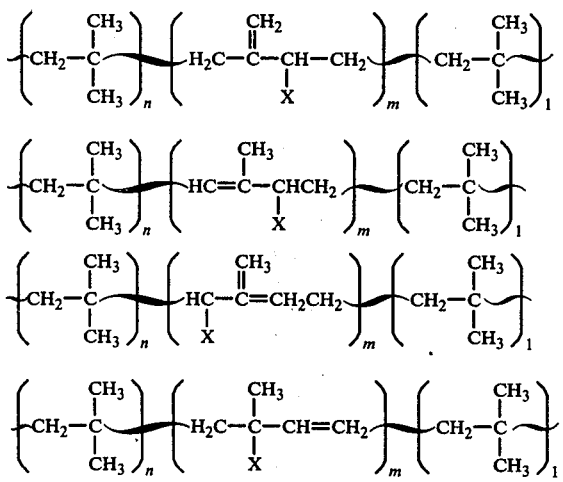

This structural location of the residual halogen has not previously been observed in conjugated diene butyl copolymers prepared by dehydrohalogenation of halogenated butyl rubber.

More importantly, the products of the present invention have been found to contain a relatively higher proportion of Diels-Alder active conjugated diene isomeric structures. For the preferred copolymers derived from halogenated isobutylene-isoprene butyl rubber, this Diels-Alder active structure is defined as having an ultraviolet absorbance ($\lambda$ max) in the range of 227 to 232 nm (nanometers) as contrasted with Diels-Alder inactive isomers having absorbance at 238 nm and higher such as 245 nm. In the present invention, highly improved products as obtained whereas of the total conjugated diene structures present at least 50% or more, preferably about 60 to 100 mole % of the conjugated diene isomers present are Diels-Alder active isomers. These structures are considered to be predominantly exo-trans cisoid isomers:

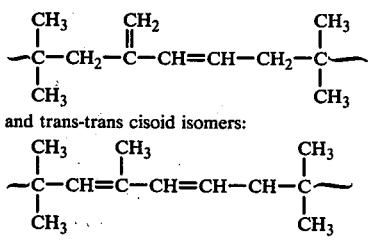

and trans-trans cisoid isomers:

$$-C-CH=C-CH=CH-CH-C-$$
with $CH_3$ groups ($\lambda$ max)

In constrast to this, CDB elastomers prepared according to the prior art processes as disclosed in U.S. Pat. Nos. 3,775,387 and 3,852,253 do not contain this relative proportion of Diels-Alder active diene isomers. This distinction has been confirmed by comparative data in dienophile curing reactions.

The invention is illustrated by the following examples which are not to be considered limitative of its scope.

EXAMPLE 1

This example illustrates generally the practice of the invention.

Table 1 reports a series of dehydrohalogenation reactions carried out using a 10% by weight cupric oxide-90% by weight activated alumina powdered catalyst. Both brominated and chlorinated isobutylene-isoprene butyl rubber were used in solution concentrations as indicated, the solvent was "Isopar G", a narrow cut isoparaffinic hydrocarbon solvent having a boiling point range of 155°–175° C. The brominated butyl rubber had a $\overline{M}v = 461,000$ and a bromine content of 1.95 wt. %; the chlorinated butyl rubber had a $\overline{M}v = 478,000$ and a chlorine content of 1.28 wt. %.

In Runs D, E and F the catalyst was added after the mixture reached the indicated reaction temperature and 0.2g activated alumina was added to remove HCl. In Run G, 10g MgO was used for this purpose and in Run H, 15g calcium naphthenate. In Run I, $N_2$ sweep was employed to remove HCl.

TABLE 1

| Dehydrohalogenation of Halogenated Butyls With 10% CuO/$\gamma$ Al$_2$O$_3$ | | | | | |
|---|---|---|---|---|---|
| Run | A | B | C | D | E |
| Halobutyl | Br-Butyl | Cl-Butyl | Cl-Butyl | Cl-Butyl | Cl-Butyl |
| Polymer, g | 30.0 | 261.0 | 50.1 | 50.1 | 50.1 |
| 10% CuO/Al$_2$O$_3$ | 1.35 | 17.23 | 0.20 | 0.20 | 0.20 |
| EA702', g | .045 | 0.19 | 0.03 | 0.03 | 0.03 |
| (Cl)/(Cu) Molar | 4.31 | 4.34 | 71.90 | 71.90 | 71.90 |
| Cement Conc., wt. % | 9.64 | 9.64 | 9.64 | 9.64 | 9.64 |
| Rxn. Time, Min. | 120 | 120 | 150 | 150 | 120 |
| Rxn. Temp., ° C. | 143 | 143 | 143 | 143 | 155 |
| Product Analysis | | | | | |
| CD, Mole % | 1.15 | 1.15 | 1.02 | 1.12 | 1.44 |
| Residual Halogen, Wt. % | 0.91 | 0.48 | 0.44 | 0.51 | 0.16 |
| $\overline{M}v \times 10^{-3}$ | 328 | 440 | 336 | 379 | — |
| Insolubles, Wt. % | 1.0 | 3.8 | 0.0 | 4.4 | 4.4 |
| Cat. Eff. # Poly/# CuO/Al$_2$O$_3$ | 22.2 | 15.2 | 252 | 252 | 252 |
| Cat. Eff. # Poly/# CuO | 222 | 152 | 2520 | 2520 | 2520 |
| Run | F | G | H | I | |
| Halobutyl | Cl-Butyl | Cl-Butyl | Cl-Butyl | Cl-Butyl | |
| Polymer, g | 50.1 | 145 | 50 | 30 | |

TABLE 1-continued

| Dehydrohalogenation of Halogenated Butyls With 10% CuO/γ Al₂O₃ | | | | |
|---|---|---|---|---|
| 10% CuO/Al₂O₃ | 0.20 | 9.5 | 1.44 | 2.0 |
| EA702¹, g | 0.03 | 0.09 | 0.02 | 0.045 |
| (Cl)/(Cu) Molar | 71.90 | 4.39 | 10 | 4.31 |
| Cement Conc., wt. % | 9.64 | 9.80 | 9.64 | 9.64 |
| Rxn. Time, Min. | 195 | 145 | 1200 | 75 |
| Rxn. Temp., °C. | 135 | 143 | 143 | 143 |
| Product Analysis | | | | |
| CD, Mole % | 0.96 | 1.04 | 1.41 | 1.14 |
| Residual Halogen, wt. % | 0.59 | 0.76 | 0.22 | 0.56 |
| $\overline{M}v \times 10^{-3}$ | — | 490 | 400 | 491 |
| Insolubles, wt. % | 5.5 | — | — | 0.3 |
| Cat. Eff. # Poly/# CuO/Al₂O₃ | 252 | — | — | 15.0 |
| Cat. Eff. # Poly/# CuO | 2520 | — | — | — |

¹EA702 - a butylated hydroxy toluene antioxidant

EXAMPLE 2

A series of chlorinated butyl dehydrohalogenations were carried out as described below:

A 9.64% w/w solution of the same chlorinated butyl rubber as in Example I was prepared. To a jacketed reactor 403 ml of the solution was added. A 143° C. constant boiling mixture of exylene/ISOPAR G was added to heating jacket. 7.5g of CuO/γ Al₂O₃ (powdered) and 0.045g EA702 were added to the solution. The stirred solution was heated to 143° C. and reacted for 60 minutes then the reactor was cooled, the stirring stopped and the catalyst allowed to settle overnight. The polymer solution was then decanted and a fresh quantity of solution equal to the first was added to the catalyst in the reactor and the process repeated 5 times. The product analyses are given below.

(Cl)/(CuO) = 1.19 (molar) (initial conc.) 60' at 143° C.

TABLE 2

| Run # | CD Mole % | λMax | $\overline{M}v \times 10^{-3}$ | Cl (residual) Wt. % |
|---|---|---|---|---|
| A | 0.98 | 237–232 | 523 | 0.70 |
| B | 0.95 | 237–232 | 516 | 0.65 |
| C | 0.94 | 237–232 | 566 | 0.76 |
| D | 0.95 | 237–232 | 516 | 0.75 |
| E | 0.95 | 237–232 | 500 | 0.72 |

The results indicate that repeated use of the same catalyst consistently produced a high quality CDB product as indicated by the UV absorbance at 232–237 nm.

EXAMPLE 3

The chlorinated butyl rubber solution of Example 1 was treated with a series of copper catalysts, both supported and unsupported, to demonstrate the requirement that an activated alumina support medium be used with certain catalysts. As is seen by the data in the Table 3 below, for dehydrochlorination only copper sulfate is effective in the absence of activated alumina support. Thus, Runs C, F and G are examples of the invention and Runs A, B, D and E are comparative examples showing the production of elastomers having either excessive molecular weight loss or inactive Diels-Alder diene structure.

TABLE 3

| Run Catalyst | A CuO | B 79% CuO/ Silicate | C 10% CuCl₂/ γ Al₂O₃ | D CuCl₂ | E Cu₂Cl₂ | F 10% Cu₂O γ Al₂O₃ | G CuSO₄ |
|---|---|---|---|---|---|---|---|
| Rxn. Temp. °C. | 135 | 143 | 143 | 143 | 143 | 143 | 143 |
| Rxn. Time, Min. | 120 | 60 | 120 | 180 | 120 | 150 | 120 |
| CD, Mole % | 0.81 | 0.92 | 1.02 | 0.88 | 1.47 | 1.04 | 1.12 |
| λMax | 239 (245) | 239 (245) | 237 (232) | 238 (245) | 245 (240) | 238 (232–245) | 238 |
| Cl, Wt. % | 0.67 | 0.42 | — | 0.43 | 0.24 | — | 0.43 |
| $\overline{M}v \times 10^{-3}$ | 349 | 283 | 478 | 344 | 220 | — | 411 |
| Insolubles, Wt. % | 1.4 | 1.1 | 5.1 | 4.7 | 0.0 | — | 0.0 |
| (Cl)/(Cu) Molar | 1.71 | 2.0 | 3.9 | 2.0 | 2.0 | 3.86 | 2.0 |

EXAMPLE 4

A solution of the brominated butyl rubber as described in Example 1 was successfully dehydrobrominated at 150° C. at a reaction time of 1080 minutes using Ta₂O₅ catalyst (unsupported, dried 72 hours at 160° C. in vacuum dessicator) to produce a product having a 1.20 mole % conjugated diene content, a UV absorbance (λ max.) at 238 nm, a residual bromine content of about 0.05% by weight and a $\overline{M}v = 415,000$.

EXAMPLE 5

In this example the physical properties of a CDB prepared according to the invention with a cupric oxide-activated alumina catalyst were compared with those of a CDB prepared by the conventional zinc carboxylates process according to the method of U.S. Pat. No. 3,775,387. Both polymers were cured by a Diels-Alder crosslinking procedure using trimethylolpropanetrimethacrylate as the dienophile. Both polymers used were derived from chlorinated isobutylene-isoprene butyl rubber. The CDB prepared according to the present invention using a 10% CuO/γ Al₂O₃ catalyst had a 1.17 mole % diene content, a residual chlorine content of 0.71 wt. % and a $\overline{M}v = 470,000$. The prior art CDB product had 1.47 mole % conjugated diene, 0.10 wt. % chlorine and a $\overline{M}v = 416,000$.

The point of the comparison is that the CDB of the present invention, despite its lower overall diene content and higher residual chlorine content, exhibits properties in the vulcanized state which compare favorably with the polymer prepared by the more complicated zinc carboxylate process which has a higher total diene content. It should be emphasized that polymer units containing residual chlorine cannot participate in the crosslinking reaction in the conditions employed. This indicates that the process of the present invention produces CDB polymers having a substantially higher proportion of Diels-Alder active diene functionality relative to the overall mole % diene content. The evaluations are in Table 4 below.

TABLE 4

| Base Recipe Parts by Weight: | CDB - 100; HAF Black - 36; Super Multiflex - 52; AgeRite Resin D (quinoline derivative rubber antioxidant) - 3; Stearic Acid - 2; Sunpar-2280 (paraffinic oil) - 7.5 | |
|---|---|---|
| CDB, Process Used | Zinc Carboxylate | CuO/Al$_2$O$_3$ |
| Sr - 351 (trimethylol propane triacrylate) | 1.75 | 1.75 |
| Cured 30' at 160° C. | | |
| Tensile, MPa | 9.96 | 11.02 |
| Elongation, % | 500 | 670 |
| Aged 7 Days at 170° C. | | |
| Tensile, MPa | 6.24 | 6.68 |
| Elongation, % | 210 | 170 |
| Aged 14 Days at 170° C. | | |
| Tensile, MPa | 1.76 | 3.55 |
| Elongation, % | 235 | 195 |

EXAMPLE 6

To demonstrate the structural difference of the primary allylic halogen in the CDB polymers of the present invention with conventional halobutyl structures as depicted in the specification, an attempt was made to remove the residual halogen in the products of the invention using a system comprising zinc-2-ethylhexanoate, magnesium oxide and calcium stearate. This system readily dehydrochlorinates conventional chlorinated butyl rubber but fails to remove any residual chlorine from the CDB polymers of the present invention (Runs B, C and D). The results are in Table 5 below. All the polymers are of the isobutylene-isoprene type.

TABLE 5

Attempted Removal of Residual Halogen From CDB Prepared Using CuO/γAl$_2$O$_3$

| Run # | A | B | C | D |
|---|---|---|---|---|
| HT-1068, g | 30$^{(1)}$ | — | — | — |
| CDB, g | — | 30$^{(2)}$ | 30$^{(3)}$ | 30$^{(4)}$ |
| MgO (Maglite D), g | 0.6 | 2.1 | 2.1 | 2.1 |
| Zinc-2-ethylhexanoate | 1.2 | 1.1 | 1.1 | 1.1 |
| Calcium Stearate | — | 0.3 | 0.3 | 0.3 |
| EA702, g | — | 0.02 | 0.02 | 0.02 |
| Xylene, ml | 300 | 300 | 300 | 300 |
| Rxn. Temp. ° C. | | 135° | 135° | 135° |
| Rxn. Time, min. | | 60 | 60 | 60 |
| Product Analyses | | | | |
| CD, mole % | 1.29 | 0.94 | 1.14 | 1.15 |
| Cl, wt. % | 0.06 | 0.74 | 0.49 | 0.48 |
| $\bar{M}v \times 10^{-3}$ | — | 519 | 427 | 483 |
| Ester, mole % | — | 0.016 | 0.00 | — |

$^{(1)}$Chlorinated butyl rubber 1.13 wt. % Cl
$^{(2)}$0.96 mole % CD; 0.67 wt. % Cl; $\bar{M}v$ = 520,000
$^{(3)}$1.15 mole % CD; 0.48 wt. % Cl; $\bar{M}v$ = 440,000
$^{(4)}$Repeat of 3 but zinc salt added after reactor heated to 135° C.

EXAMPLE 7

The CDB elastomers prepared in accordance with the present invention were subjected to cure study and oven aging tests to evaluate the resistance of the product to thermal-oxidative degradation both in the vulcanized and bulk states. The purposes were to compare the products of the invention with those prepared by the prior art zinc carboxylate process of U.S. Pat. No. 3,775,387 and to evaluate the effect of residual quantity of metal catalyst, especially copper catalysts, on the thermal aging properties of the polymer, the latter being of particular importance since it is well known that free copper in a high molecular weight polymer can act as an oxidation catalyst.

The data set forth in Tables 6, 7 and 8 show that the CDB polymers of the present invention exhibit excellent resistance to thermal oxidative degradation and are equivalent to those prepared by the zinc carboxylate method, not withstanding the difference in conjugated diene and residual chlorine content and the presence of residual amounts of copper catalyst, one CDB containing 13 ppm of copper (as CuO/Al$_2$O$_3$). Free copper salts on the other hand may reduce the resistance to thermal degradation.

In Table 6 dienophile and sulfur cures were carried out. The zinc carboxylate CDB dienophile returned a small advantage in elongation during aging and a smaller change in Shore A hardness, while the samples of the present invention showed slightly higher tensile strengths and moduli reflected in higher crosslink densities (lower cyclohexane swell).

In Table 7 the results of a 21-day aging test at 121° C. for sulfur-Santocure NS vulcanizates is reported. The aging results show that compound 2, a product of the invention, retained higher tensile and modulus values but a slightly greater loss of elongation and increased hardness.

Dienophile cure data is presented in Table 8 using trimethylolpropane-trimethacrylate as the curing agent. Compound 3, a product of the invention, displayed the highest original tensile and elongation. On aging the tensile advantage was retained but compounds 1 and 2 had better elongation retention. At 14 days compound 3 still possessed a (TE)$_c$ value, critical tensile-elongation product, greater than the acceptable practical minimum of 3.45 MPa and 100% elongation. None of the other compounds could be considered useful at 14 days.

TABLE 6

Aging Studies-Sulfur Santocure NS and-Trimethylolpropanetriacrylate Systems

| Compound, phr | A | B | C | D |
|---|---|---|---|---|
| CDB$^1$ | 100 | — | 100 | — |
| CDB$^2$ | — | 100 | — | 100 |
| Philblack N330 | 36 | 36 | 36 | 36 |
| Super Multiflex | 52 | 52 | 52 | 52 |
| Age Rite Resin D$^3$ | 2 | 2 | 2 | 2 |
| Stearic Acid | 2 | 2 | 2 | 2 |
| Sunpar 2280 | 7.5 | 7.5 | 7.5 | 7.5 |
| Zinc Oxide | 5 | 5 | — | — |
| Sulfur | 1 | 1 | 13 | — |
| Santocure NS | 2 | 2 | — | — |
| TMPTA (SR351) | — | — | 1.75 | 1.75 |
| Original Physical Properties | | | | |
| Cure time, min. | 60 | 60 | 15 | 15 |
| Cure temp. ° C. | 153 | 153 | 120 | 120 |
| Tensile, MPa | 12.69 | 12.93 | 12.23 | 11.79 |

TABLE 6-continued

Aging Studies-Sulfur Santocure NS and-Trimethylolpropanetriacrylate Systems

| Compound, phr | A | B | C | D |
|---|---|---|---|---|
| Elongation, % | 490 | 505 | 670 | 600 |
| Mod. at 300%, MPa | 6.07 | 6.61 | 3.38 | 4.82 |
| Shore A | 55 | 60 | 52 | 54 |
| Swell Ratio/Wt. % Solubles in Cyclohexane | 2.80/2.76 | 2.85/4.54 | 3.19/4.57 | 2.77/4.74 |
| Cure time, min. | 30 | 30 | 30 | 30 |
| Cure temp. ° C. | 160 | 160 | 160 | 160 |
| Tensile, MPa | 11.92 | 12.30 | 11.89 | 9.96 |
| Elongation, % | 540 | 545 | 540 | 455 |
| Mod. at 300%, MPa | 4.41 | 4.93 | 5.24 | 5.62 |
| Shore A | 54 | 54 | 54 | 55 |
| Swell Ratio/Wt. % Solubles | 3.08/5.45 | 3.01/48.7 | 3.04/5.13 | 2.78/4.93 |
| Cure time, min. | | | 60 | 60 |
| Cure temp. ° C. | | | 160 | 160 |
| Tensile, MPa | | | 9.76 | 9.79 |
| Elongation, % | | | 390 | 370 |
| Mod. at 300%, MPa | | | 6.96 | 7.48 |
| Shore A | | | 56 | 57 |
| Swell Ratio/Wt. % Solubles | | | 2.77/3.55 | 2.72/5.58 |
| Aged Physical Properties | | | | |
| Cure Identificaton | 60' at 153° C. | 60' at 153° C. | 15' at 160° C. | 15' at 160° C. |
| Days Aged at ° C. | 7/121° C. | 7/121° C. | 7/170° C. | 7/170° C. |
| Tensile, MPa | 6.83 | 7.24 | 7.52 | 6.52 |
| Elongation, % | 415 | 455 | 155 | 205 |
| Mod. at 100%, MPa | 1.83 | 2.03 | 4.79 | 3.10 |
| Mod. at 300%, MPa | 4.93 | 5.27 | — | — |
| Shore A | 60 | 60 | 70 | 65 |
| Swell Ratio/Wt. % Solubles | — | — | 1.49/3.62 | 1.50/3.03 |
| Cure Identification | 30' at 160° C. | 30' at 160° C. | 30' at 160° C. | 30' at 160° C. |
| Days Aged at ° C. | 7/121° C. | 7/121° C. | 7/170° C. | 7/170° C. |
| Tensile, MPa | 7.58 | 7.34 | 6.90 | 6.62 |
| Elongation, % | 370 | 410 | 145 | 200 |
| Mod. at 100%, MPa | 2.21 | 1.93 | 4.76 | 3.28 |
| Mod. at 300%, MPa | 6.24 | 5.52 | — | — |
| Shore A | 64 | 64 | 70 | 66 |
| Swell Ratio/Wt. % Solubles | — | — | 1.48/3.64 | 1.63/4.73 |
| Cure Identification | — | — | 60/160 | 60/160 |
| Days Aged at ° C. | — | — | 7/170 | 7/170 |
| Swell Ratio/Wt. % Solubles | — | — | 1.53/3.88 | 1.58/3.52 |

[1] CuO/Al$_2$O$_3$ CDB CD = 1.18 mole % Insol. = 2.7 wt. % Cl = 0.54 wt. % $\bar{M}v$ = 395,000 Cu = 13 ppm (as CuO/δ Al$_2$O$_3$)
[2] Zn(O$_2$CR) CDB CD = 1.47 mole % Cl = 0.10 wt. % $\bar{M}v$ = 416,000
[3] poly-2,2,4-trimethyl-1,2-dihydroquinoline

TABLE 7

COMPARISON OF UNAGED AND AGED SULFUR CURED CDB VULCANIZATES

| Compound, phr | 1 | 2 | 3 |
|---|---|---|---|
| CDB[1] | — | 100 | 100 |
| CDB[2] | 100 | — | — |
| Philblack N330 | 36 | 36 | 36 |
| Flextol H[4] | 2.0 | 2.0 | 2.0 |
| DuPont DMD[3] | — | — | 1.0 |
| Protox (ZnO) 166 | 5.0 | 5.0 | 5.0 |
| Super Multiflex | 52 | 52 | 52 |
| Stearic Acid | — | 2.0 | 2.0 |
| Sunpar 2280 | 7.5 | 7.5 | 7.5 |
| Sulfur | 2.0 | 2.0 | 2.0 |
| Santocure NS | 1.0 | 1.0 | 1.0 |

| Original Physical Properties | | | | | | | | | |
|---|---|---|---|---|---|---|---|---|---|
| Cured min. at 153° C. | 15 | 30 | 60 | 15 | 30 | 60 | 15 | 30 | 60 |
| Tensile, MPa | 12.00 | 11.86 | 11.62 | 8.27 | 11.76 | 12.41 | 11.17 | 11.62 | 12.38 |
| Elongation, % | 605 | 505 | 440 | 650 | 450 | 435 | 555 | 525 | 465 |
| 300%. Mod., MPa | 5.00 | 5.86 | 6.48 | 2.45 | 5.69 | 6.55 | 4.65 | 5.58 | 7.17 |
| Shore A | 55 | 60 | 62 | 55 | 56 | 60 | 58 | 60 | 65 |
| Swell Ratio/Wt. % Solubles in Cyclohexane | 3.20/5.62 | 2.82/4.86 | 2.73/5.02 | 3.92/6.06 | 2.88/4.72 | 2.70/4.70 | 2.95/5.84 | 2.73/5.56 | 2.65/5.41 |

| Aged Physical Properties Compound | 1 | | | 2 | | | 3 | | |
|---|---|---|---|---|---|---|---|---|---|
| Cure Conditions | 15' at 153° C. | | | | | | | | |
| Days Aged at 121° C. | 7 | 14 | 21 | 7 | 14 | 21 | 7 | 14 | 21 |
| Tensile, MPa | 8.45 | 6.14 | 5.55 | 9.00 | 6.41 | 6.96 | 7.93 | 7.14 | 6.45 |
| Elongation, % | 380 | 350 | 335 | 270 | 280 | 260 | 290 | 300 | 270 |
| Shore A | 64 | 60 | 64 | 68 | 66 | 66 | 74 | 70 | 70 |
| Cure Conditions | 20' at 153° C. | | | | | | | | |
| Tensile, MPa | 8.10 | 6.34 | 5.10 | 8.76 | 7.00 | 6.72 | 8.34 | 6.90 | 6.31 |
| Elongation, % | 395 | 345 | 310 | 295 | 300 | 270 | 305 | 305 | 285 |
| Shore A | 65 | 65 | 65 | 69 | 68 | 68 | 72 | 70 | 68 |
| Cure Conditions | 60' at 153° C. | | | | | | | | |
| Tensile, MPa | 8.10 | 6.34 | 6.10 | 8.27 | 6.72 | 6.79 | 8.14 | 6.41 | 6.03 |
| Elongation, % | 395 | 345 | 365 | 310 | 305 | 310 | 310 | 295 | 300 |

TABLE 7-continued

| | | | | | | | | | |
|---|---|---|---|---|---|---|---|---|---|
| Shore A | 68 | 65 | 65 | 68 | 65 | 70 | 72 | 66 | 70 |

[1]$CuO/\delta Al_2O_3$ CDB CD = 1.13 mole %, $Mv$ = 383,000 Insolubles - 2.4 wt. % Cl = 0.51 wt. %;
[2]$Zn(O_2CR)$ CD = 1.47 mole %, $Mv$ = 416,000 Cl = 0.10 wt. %
[3]DuPont DMD N,N' - Disalicylidene - 1,2 propane diamine
[4]Flectrol H Purified form of poly-2,2,4-trimethyl-1,2-dihydroquinoline

TABLE 8
COMPARISON OF UNAGED AND AGED DIENOPHILE CURED CONJUGATED DIENE BUTYLS

| Masterbatch | | A | B | | |
|---|---|---|---|---|---|
| | CDB[1] | — | 100 | | |
| | CDB[2] $CuO/\delta$ 100 | | | | |
| | Philblack N330 | 36 | 36 | | |
| | Super Multiflex | 52 | 52 | | |
| | Age Rite Resin D | 2.0 | 2.0 | | |
| CuO/δStearic Acid | | 2.0 | 2.0 | | |
| | Sunpar 2280 | 7.5 | 7.5 | | |
| Compound | | 1 | 2 | 3 | 4 |
| | Masterbatch A | 199 | 199 | — | — |
| | Masterbatch B | — | — | 199 | 199 |
| | DuPont DMD[3] | — | 1 | — | 1 |
| | Sr-351 (TMPTA)[4] | 1.75 | 1.75 | 1.75 | 1.75 |
| | Cure 30' at 160° C. | | | | |
| Unaged and Aged Physical Properties | | | | | |
| Days at 170° C. | 0 7 14 | 0 7 14 | 0 7 14 | 0 7 14 | |
| Tensile, MPa | 9.93 6.24 1.76 | 9.93 5.45 1.14 | 11.03 6.69 3.55 | 7.14 4.17 1.93 | |
| Elongation, % | 500 210 235 | 470 205 270 | 670 170 195 | 280 140 175 | |
| Modulus at 100%, MPA | 0.93 2.65 0.72 | 1.07 2.38 0.41 | 0.66 3.86 1.79 | 1.34 3.03 1.24 | |
| Shore A | 47 65 55 | 49 64 53 | 45 67 62 | 52 66 61 | |

[1]$CuO/\alpha Al_2O_3$ CDB CD = 1.17 mole %; $Mv$ = 470,000; Insolubles = 3.5 wt. %; Cu = 13ppm (as $CuO/\alpha Al_2O_3$)
[2]$Zn(O_2CR)_2$CDB CD = 1.47 mole %; $Mv$ = 416,000
[3]DMD = N,N' - Disaicylidene - 1,2 propane diamine
[4]Trimethylolpropanetriacylate

What is claimed is:

1. A method for dehydrohalogenating an allylically halogented unsaturated hydrocarbon polymer which comprises contacting said polymer in the liquid phase at a temperature of about 50° to 250° C. in the presence of a dehydrochlorination catalyst selected from the group consisting of activated alumina supported CuO, $Cu_2O$, and $CuCl_2$, catalyst composition or a dehydrobromination catalyst selected from the group consisting of activated alumina supported CuO, $Cu_2O$ and $CuCl_2$ catalyst compositions.

2. The method of claim 1 wherein the dehydrohalogenation is carried out in solution.

3. A method for preparing a conjugated diene butyl elastomer copolymer, said copolymer consisting of 85 to 99.5% by weight of a $C_4$-$C_7$ isoolefin combined with 15 to 0.5% by weight conjugated $C_4$-$C_{14}$ diolefin, the copolymer having randomly distributed sites of conjugated diene unsaturated isomers and a residual halogen content of about 0.05 to 0.9% by weight which comprises dehydrohalogenating in the liquid phase at a temperature of about 50° C. to 250° C. a chlorinated butyl rubber in the presence of a catalyst selected from the group consisting of activated alumina supported CuO, $Cu_2O$ and $CuCl_2$, catalyst compositions or a brominated butyl rubber in the presence of activated alumina supported CuO, $Cu_2O$, $CuCl_2$ catalyst compositions.

4. The method of claim 3 wherein the dehydrohalogenation is carried out in solution.

5. The method of claim 3 wherein the isoolefin is isobutylene and the diolefin is isoprene.

6. The method of claim 3 wherein the catalyst is activated alumina supported $Cu_2O$ or CuO.

7. The method of claim 6 wherein chlorinated butyl rubber is dehydrohalogenated.

8. The method of claim 6 wherein brominated butyl rubber is dehydrohalogenated.

9. The method of claim 3 wherein the dehydrohalogenation is carried out at a temperature of 100° to 180° C.

10. the method of claim 4 wherein the concentration of halogented butyl rubber in solution is about 5 to 20% by weight.

11. The method of claim 5 wherein the residual halogen is present as a primary allylic halogen.

12. The product by the process of claim 11.

13. The method of claim 5 wherein the mole % conjugated diene isomer content is about 0.4 to 10.0% for copolymers having a $\overline{M}v$ less than 100,000, at least 50% of said conjugated diene content being Diels-Alder active diene isomers.

14. The method of claim 5 wherein the mole % conjugated diene isomer content is about 0.4 to 4% for copolymers having a $\overline{M}v$ greater than 100,000.

15. The method of claim 14 wherein 60 to 100 mole % of said conjugated diene isomers are Diels-Alder active diene isomers.

16. The method of claim 14 wherein chlorinated butyl rubber is dehydrohalogenated.

17. The method of claim 1 wherein said catalyst selected from the group consisting of said activated alumina supported CuO, $Cu_2O$ and $CuCl_2$ is present at a concentration based on the molar ratio of halogen in the allylically halogenated polymer feedstock to metal in the metal-containing catalyst of from about 5000:1 to about 1:10.

18. The method of claim 17 wherein said molar ratio is from abut 2500:1 to about 1:1.

19. The method of claim 3 wherein said catalyst comprises from about 0.5% to 50% by weight of CuO or-$Cu_2O$ or $CuCl_2$ and about 95.5% to 50% by weight of said activated alumina support.

20. The method of claim 19 wherein said catalyst comprises from about 5% to 15% by weight of CuO or $Cu_2O$ or $CuCl_2$ and from about 95% to 85% by weight of said activated alumina support.

* * * * *